United States Patent [19]

D'Andrade

[11] Patent Number: 4,601,519

[45] Date of Patent: Jul. 22, 1986

[54] WHEEL WITH EXTENDABLE TRACTION SPIKES AND TOY INCLUDING SAME

[76] Inventor: Bruce M. D'Andrade, 3 Ten Eyck Rd., Whitehouse Station, N.J. 08889

[21] Appl. No.: 784,252

[22] Filed: Oct. 4, 1985

[51] Int. Cl.⁴ .............................................. B60B 15/12
[52] U.S. Cl. .................................. 301/45; 301/41 R; 446/448; 446/465
[58] Field of Search .................. 301/41 R, 43, 45, 47, 301/48, 51, 46; 446/448, 465, 457; 226/57, 81

[56] References Cited

U.S. PATENT DOCUMENTS

| 1,605,386 | 11/1926 | Beibin | 301/47 |
| 2,913,093 | 11/1959 | Bevan | 226/81 X |
| 4,547,173 | 10/1985 | Jaworski et al. | 446/465 X |

FOREIGN PATENT DOCUMENTS

| 419951 | 1/1911 | France | 301/48 |
| 118387 | 8/1918 | United Kingdom | 301/48 |
| 637493 | 5/1950 | United Kingdom | 301/47 |
| 802257 | 10/1958 | United Kingdom | 301/47 |

*Primary Examiner*—David A. Scherbel
*Assistant Examiner*—Russell D. Stormer
*Attorney, Agent, or Firm*—Kenneth P. Glynn

[57] ABSTRACT

The present invention wheels have extendable traction spikes (spike pins) which are contained within the wheels and are automatically extended to enhance wheel traction. The automatic extension of the spike pins occurs, in one embodiment, upon achievement of a predetermined torque. In another embodiment, when a predetermined movement, i.e. forward motion of the vehicle, occurs, the spike pins are automatically extended. The invention also includes vehicular toys including such wheels.

18 Claims, 6 Drawing Figures

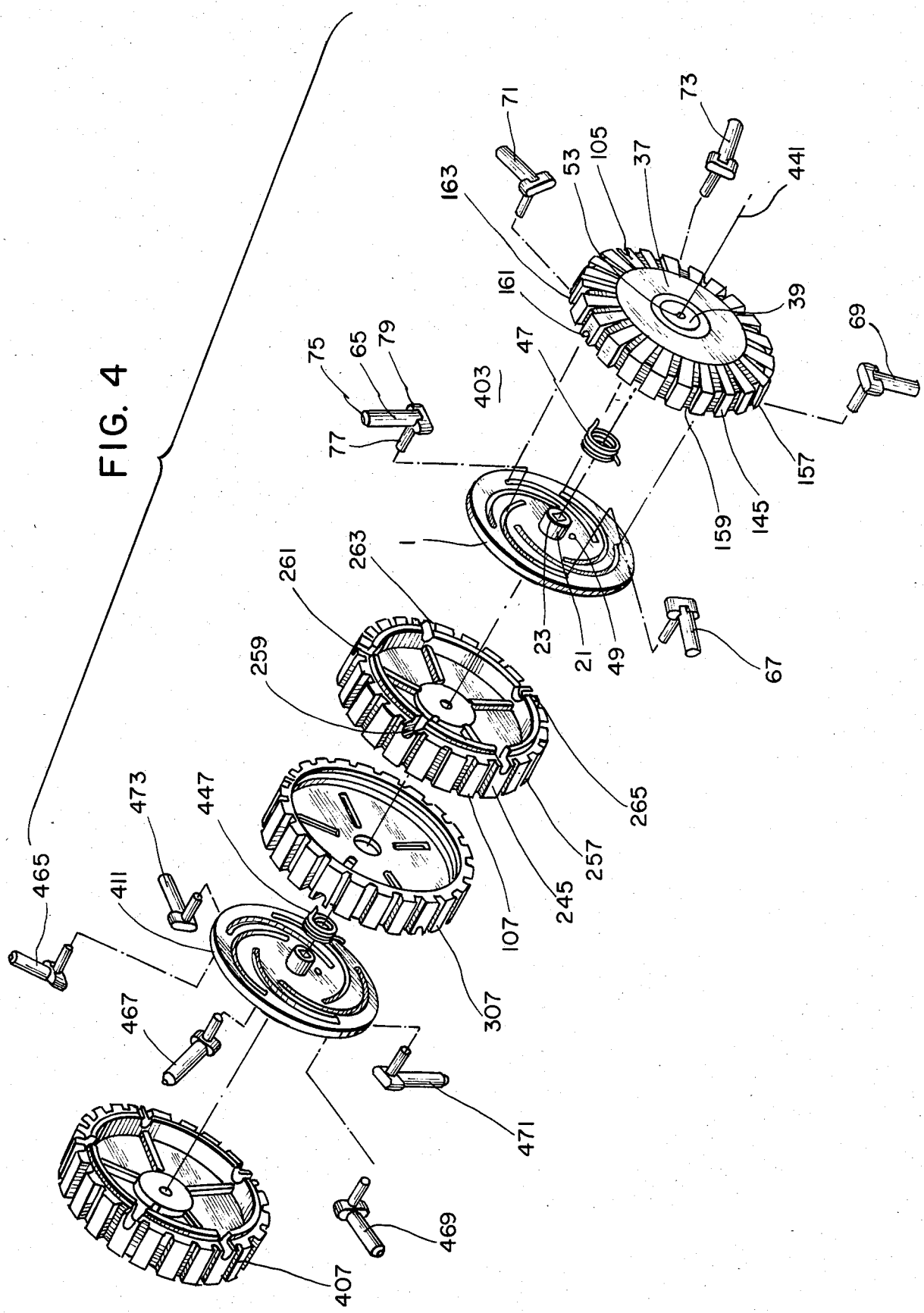

WHEEL WITH EXTENDABLE TRACTION SPIKES AND TOY INCLUDING SAME

BACKGROUND OF THE INVENTION

1. Field of the Invention

The present invention relates to wheels having extendable traction spikes and to toys which include such wheels. More specifically, the wheels of the present invention have a plurality of traction spikes called spike pins which are contained within the wheel and, in response to either a predetermined movement or achievement of a predetermined torque, the spike pins are automatically extended to enhance wheel traction.

2. Prior Art Statement

There are many hundreds of patents directed to traction enhancing spikes for wheels, but none have been found to teach the unique features of the present invention whereby the spike pins are automatically extended to enhance traction in response to a predetermined movement or to an attainment of a predetermined torque level. Exemplary of this prior art are the following patents:

U.S. Pat. No. 756,395 to J. P. McEwing describes a traction wheel which includes spikes (called "cleats") disposed within slots in the wheel and which extend out by contact of guide wheels at the end of each spike with an eccentric cam. Unlike the present invention wheel, the spikes of McEwing extend out for ground traction independent of whether or not the wheel is moving and independent of achievement of a predetermined level of torque. Also, the functional elements are different and operate differently.

U.S. Pat. No. 1,308,513 to F. Voegeli teaches a traction wheel which includes a plurality of traction members which are pivotably attached at one end to the wheel rim and can swing out and be locked in a traction enhancing position. Hand operation is required to lock each traction member and automatic extension is not taught nor are any of the elements of the present invention.

U.S. Pat. No. 1,702,617 to P. Pfeifer describes a tractor wheel with adjustable lugs for increased traction. Again, hand operation is required and none of the essential elements of the present invention are taught.

U.S. Pat. No. 1,890,872 to L. S. Van Kleeck illustrates an antiskid device which includes spikes which are attached to a disc which may be fitted to a wheel hub. The spikes are connected to a two position bowed carrier for retraction or extension of the spikes as may be desired. Hand operation of a spring-anchored member requires the use of a wrench or tool.

U.S. Pat. No. 1,997,835 to F. H. Sandherr describes a tractor wheel with traction spikes which retract and extend due to the eccentric position of the flange, resulting in the ground contact spikes being extended and the spikes away from the ground being partially or fully retracted. Whether or not a particular spike is extended depends only on its position on the wheel relative to the ground and does not depend upon whether or not there is movement or attainment of torque.

U.S. Pat. No. 2,714,042 to E. E. Kelly describes a traction attachment for wheels which is designed to be bolted adjacent to a wheel. It has spikes which extend or retract in response to rotation of a slotted cam plate. This must be done manually (two hand grips are provided). The spikes respond only to manual rotation of the cam plate and do not extend in response to wheel motion or torque.

U.S. Pat. No. 3,712,359 to Victor E. Williams describes "crazy tires" which have spikes or bumps inside a tire. These do not extend and none of the elements of the present invention are taught.

U.S. Pat. No. 4,266,832 to Antoine Delauney and Michael Boyer teaches a vehicle wheel anit-slip device whereby blades are extended through the wheel by actuation of a roller manually or by hydraulic jack. Again, the present invention elements are not taught nor are the same objectives achieved.

SUMMARY OF THE INVENTION

The present invention wheels have extendable traction spikes (spike pins) which are contained within the wheels and are automatically extended to enhance wheel traction. The automatic extension of the spike pins occurs, in one embodiment, upon achievement of a predetermined torque, and, in another embodiment, when a predetermined movement, i.e. forward motion of the vehicle, occurs. The invention also includes vehicular toys including such wheels.

BRIEF SUMMARY OF THE DRAWINGS

The present invention will be more particularly described and understood below in conjunction with the drawings, wherein

FIG. 4 illustrates an embodiment of the present invention wheel utilizing three external wheel members and two cam discs;

DETAILED DESCRIPTION OF THE INVENTION AND DRAWINGS

As stated, the present invention involves unique wheels as well as vehicular toys containing these wheels. The present invention wheels have spike pins which project radially from the center towards the outer peripheral travel surface (typically "tire treads"). These spike pins are connected to a cam disc which has slider slots which are arcuated and which guide the spike pins so that the spike pins rest entirely within the wheel or are projected out of orifices in the outer peripheral travel surface. The spike pins are projected by rotation of the cam disc relative to the wheel and the rotation may be such that the connection point of the spike pins travel from a first position (low point) to a second position (high point) along the arcuated slots, or at some point in between so as to effect at least partial projection.

The purpose of the invention is to have the spike pins come out to enhance traction on an automatic basis.

In one embodiment, increased torque causes the rotation of the cam disc to occur relative to the rest of the wheel. Thus, in this embodiment, the present invention wheel, and vehicular toys containing same, may have bias means, such as a rubber band or torsion spring, which holds the cam disc stationary relative to the rest of the wheel, until high torque is applied which causes the bias means to give, i.e. to allow the cam disc to rotate relative to the rest of the wheel, and thereby cause the spike pins to project. Preferably, a toy may have this arrangement and may be a motorized vehicle, e.g. battery-operated car, truck or tank, or hand pushed, but when the wheels rotate for movement on a flat surface, the spike pins are held in, and when the wheels climb uphill and additional torque is applied, the spike pins are projected out and enhance traction.

In another embodiment, engagement means instead of bias means is used, and, upon rotation of the wheels, the cam disc rotates relative thereto until a projected spike pin position is achieved and the pressure of the wheel movement holds the cam disc and thus the spike pins in this position. When wheel movement is stopped, the mere weight of the vehicle (toy) pushes the spike pins back into the wheels, as the cam disc is free to rotate back to its original position.

Figure 1:
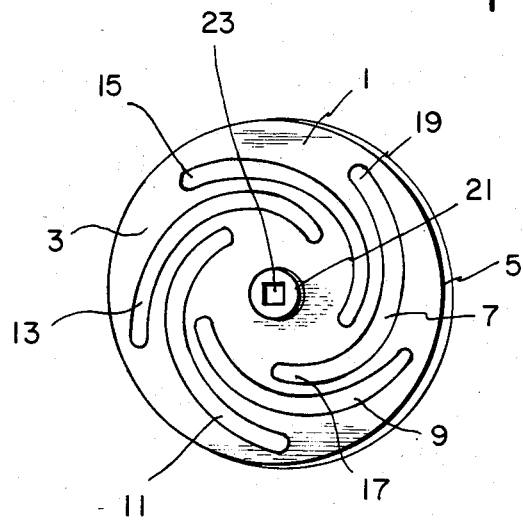
FIG. 1 shows an embodiment of the present invention wheel cam disc.

Reference is now made to the drawings and more particularly to FIG. 1.

FIG. 1 illustrates a cam disc 1 which is used in the wheels of the present invention. Cam disc 1 is made of plastic, metal, hard rubber or any other functionally viable material, but is typically made of molded plastic, and is disc-shaped with a flat surface 3 and a substantially rounded edge 5. The cam disc 1 has a plurality of arcuated slider slots 7, 9, 11, 13 and 15. These slider slots 7, 9, 11, 13 and 15 fan out from the central area of the cam disc 1 towards edge 5. Thus, as an example, arcuated slider slot 7 has a low position 17 towards the center area and a high position 19 towards edge 5, as shown. While the arcuated slider slots are five in number here, there is no particular criticality to the number of slots and three, four, six, seven or more could be used. As a matter of convenience with respect to the typical size of wheels for toys, four, five or six slider slots seem to be practical. Also, while the arcuated slider slots are shown as being equidistant here, they could be randomly spaced. However, by being equidistantly spaced apart from one another, traction and aesthetics are optimized. This particular cam disc 1 has a protrusion 21 with central axis hole 23 therethrough. The protrusion 21 is optional, but some form of protrusion or indention may be used to support a bias means or to act as an engagement means, as discussed below.

Figure 2:
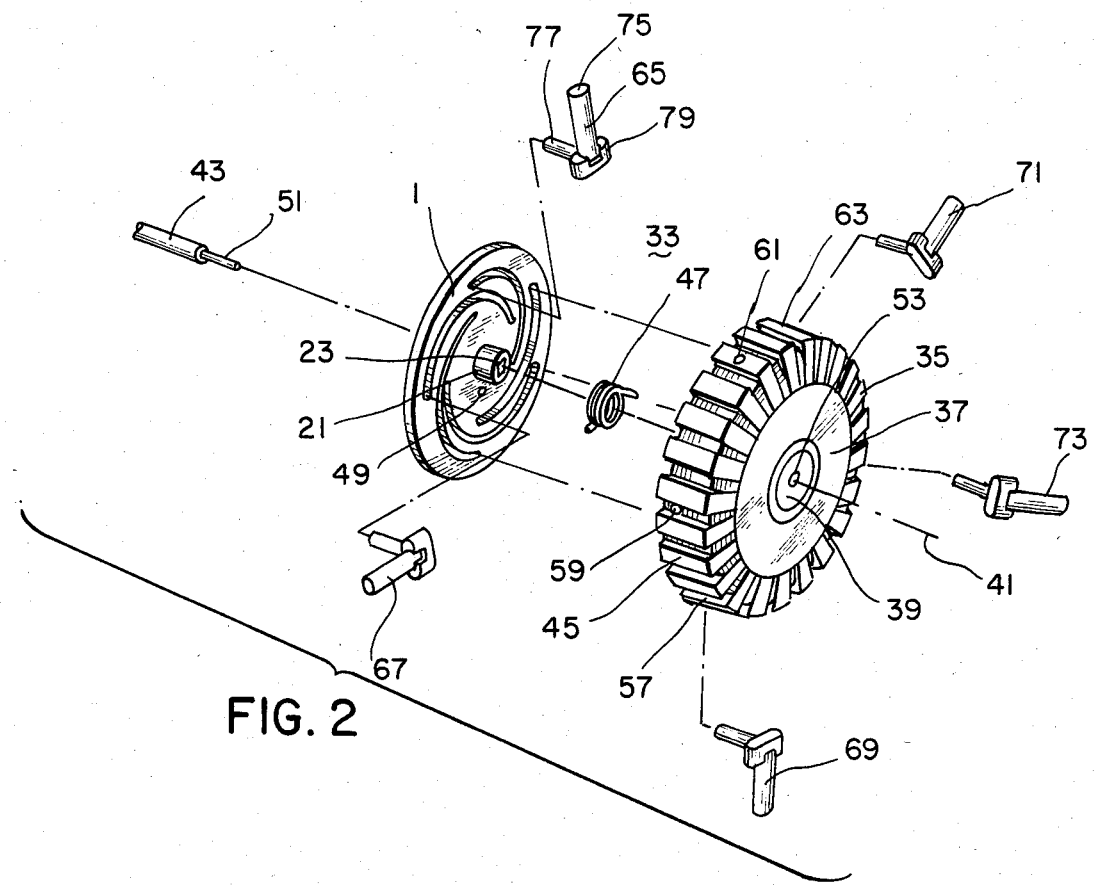
FIG. 2 sets forth an embodiment of the present invention wheel which is responsive torquing criterion.

Turning now to FIG. 2, a present invention wheel 33 is shown in an exploded view. Wheel 33 has a hollow external wheel member 35 having at least one structural rim wall 37 and having a central hub 39 on rim wall 37 which is located about a central axis 41. Hub 39 is attachable to an axle 43. External wheel number 35 has an outer peripheral travel surface 45 of a predetermined radius from said central axis 41 and surface 45 has a plurality of orifices 57, 59, 61 and 63 (one not shown) randomly located about peripheral travel surface 45, as shown. There is also cam disc 1 (described in FIG. 1) and this cam disc 1 has a lesser radius than the predetermined radius of the peripheral travel surface 45 of external wheel member 35. In this embodiment, cam disc 1 is movably located about the central hub 39 of external wheel member 35, with cam disc protrusion 21 fitting into central hub 39. Torsion spring 47 is a bias means which is fitted over protrusion 21 and one end of torsion spring 47 is inserted into placement hole 49 to hold the torsion spring in place as to cam disc 1. A second placement hole (not shown) may be used inside external wheel member 35 for insertion of the other end of torsion spring 47 to fix it relative to external wheel member 35. Axle 43 has a portion 51 which is smaller than the hole 23 in protrusion 21 (allowing free movement of cam disc 1 about axle 43) but is tightly fitting to hole 53 in central hub 39.

Wheel 33 also contains a plurality of spike pins 65, 67, 69, 71 and 73 which are elongated, as shown. Referring now to spike pin 65 as exemplary, it has a first end 79 and a second end 75 and has a length which is less than the predetermined radius of peripheral travel surface 45 of external wheel member 35. Spike pins 65, 67, 69 and 71 each have a cross section of shape and size small enough to pass through orifices 57, etc. on peripheral travel surface 45. Each spike pin having a protrusion, e.g. protrusion 77, at its first end, e.g. end 79, which is slidably located within one of the arcuated slider slots of cam disc 1. The second end, e.g. end 75, of the spike pins is located at least partially within the orifices, e.g. orifice 61, of peripheral travel surface 45.

As mentioned torsion spring 47 acts as a bias means and is connected to cam disc 1 and to external wheel member 35 as described. This acts so as to hold cam disc 1 in a first position with the plurality of spike pins 65, 67, 69, 71 and 73 being entirely located within the radius of the peripheral travel surface 45 by the predetermined positioning of the arcuated slider slots relative to the orifices of peripheral travel surface (i.e. relative to the external wheel member) and to hold the cam disc in the first position even while the wheel 33 is being moved along a surface up to a predetermined torque, and connected so as to allow cam disc 1 to rotate about central hub 39 and axis 41 up to a second position with spike pins 65, 67, 69, 71 and 73 at least partially extending and protruding through the orifices when the predetermined torque is attained, and connected so as to permit the return of cam disc 1 to the first position when the torque falls below said predetermined level.

Figure 3:
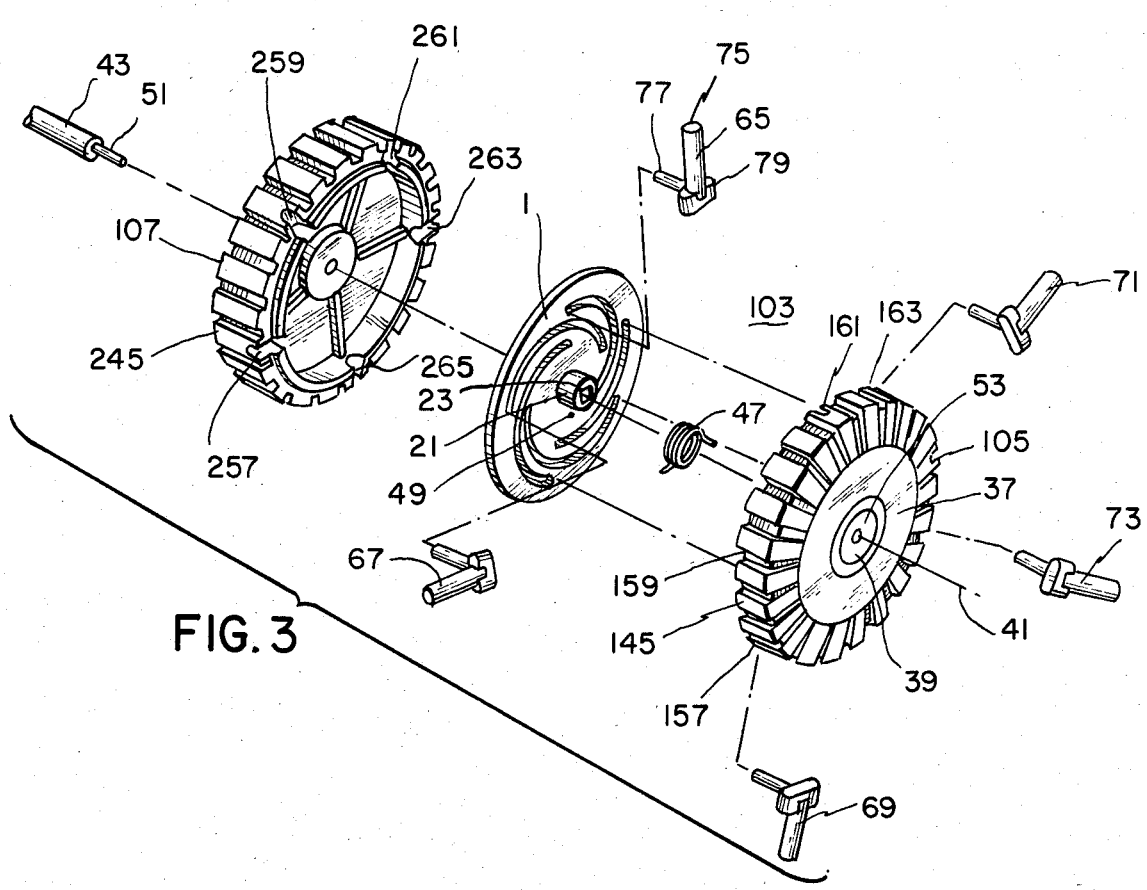
FIG. 3 shows an embodiment of the present invention wheel utilizing two external wheel members.

In FIG. 3, a similar wheel to that of FIG. 2 is shown, except that this wheel 103 includes two external wheel members, the first being external wheel member 105 and the second being external wheel member 107. The parts and aspects of parts which are identical to those of FIG. 2 above are identically numbered. Note, however, that each of the two external wheel members 105 and 107 have orifices 157, 159, 161, and 163 and orifices 257, 259, 261, 263 and 265 which correspond to one another. Outer peripheral travel surfaces 145 and 245 of external wheel member 105 and 107, respectively, are joined together at their edges such that complete holes are formed. Thus, the term "orifice" as used herein is meant to mean a complete hole or a half portion of a hole, as exemplified by FIG. 3.

FIG. 4 shows a present invention wheel similar to that of FIG. 3 with identical parts identically numbered. However, in this wheel 403, two additional external wheel members 307 and 407, respectively, are included, as well as cam disc 441, torsion spring 447 and spike pins 465, 467, 469, 471 and 473. Obviously, a longer axle would be used and all four of the external wheel members 145, 107, 307 and 407 could be joined by any known means such as snaps, glue, etc.

Figure 5:
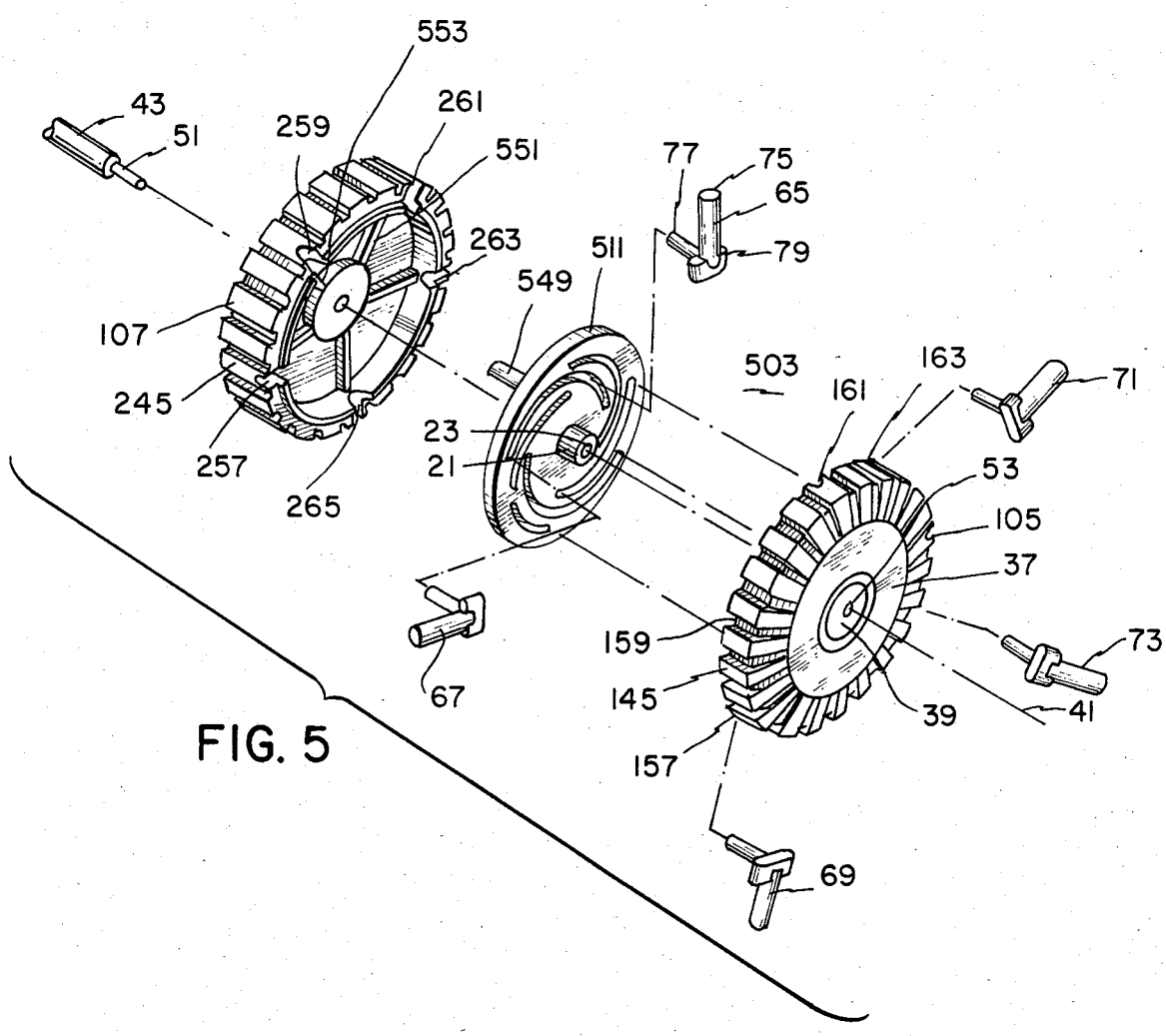
FIG. 5 shows an embodiment of the present invention wheel which is responsive to forward motion criterion; and, FIG. 6 shows a vehicular toy of the present invention.

FIG. 5 illustrates a present invention wheel 503 which is responsive to forward motion. This is basically the same device as shown in FIG. 3 except that the spring (47) has been eliminated, i.e. there is no bias means, and instead an engagement means 549 is included on cam disc 511. Engagement means 549 is, in this instance, a pin which allows the cam disc 511 to rotate only 1/5 of a circle, i.e. the engagement means 549 engages against spoke 553 of external wheel member 107 when the spike pins 65, 67, 69, 71 and 73 are in (i.e. when the weight of the vehicle on which the wheel is mounted pushes the spike pins in) and engages against spoke 551 (1/5 of a turn) when the spike pins 65, 67, 69, 71 and 75 are automatically extended upon forward motion of wheel 503 as a result of the rotation of cam disc 511 and concomitant movement of the spike pins along their respective slider slots. When the forward motion causing the aforesaid rotation of the cam disc ceases, the weight of the wheel (s) and vehicle pushes the spike pins in and they, along with the cam disc, return to their original (in) position.

Figure 6:
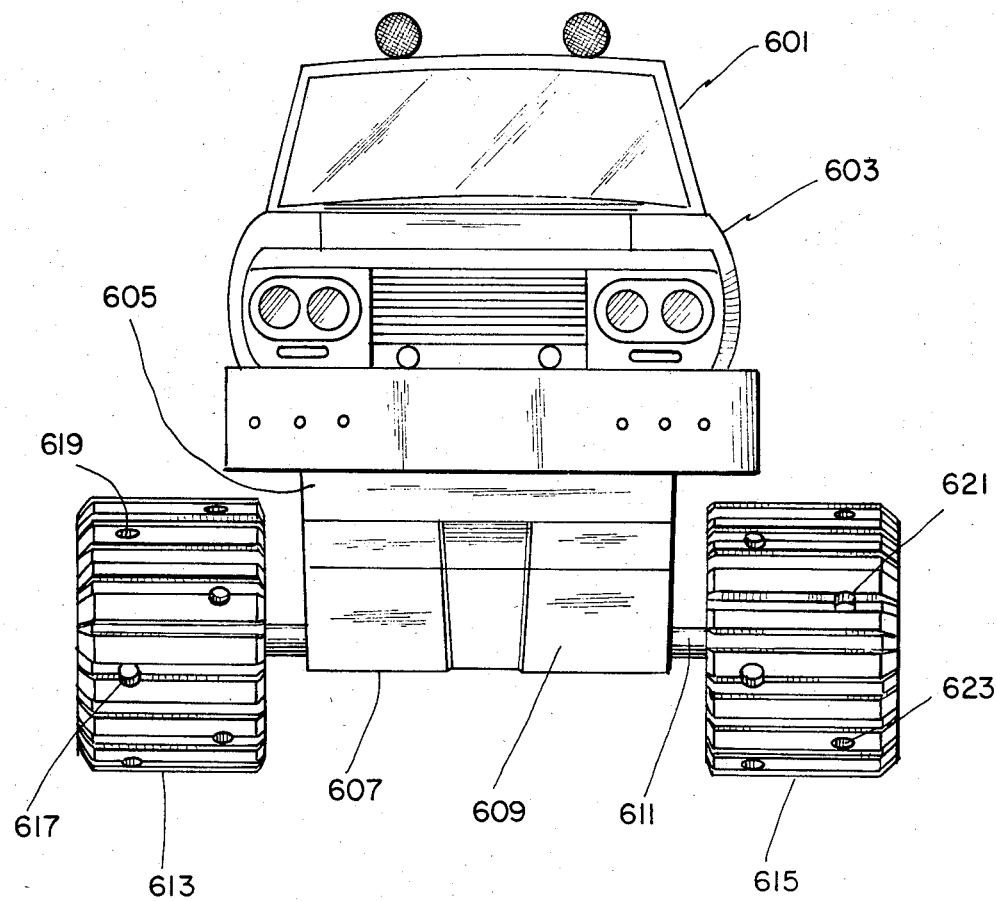

FIG. 6 illustrates an exemplary vehicular toy, namely, a frontal view of a jacked-up 4×4 pickup truck 601. Truck 601 has a body 603 and a frame 605. The frame 605 has an undercarriage 607 which includes a battery-operated motor and battery holding area 609. Axle 611, which is motor driven, drives wheel 613 and wheel 615. While toy truck 601 is shown here as having front wheel drive, it could have back wheel drive. Wheels 613 and 615 as shown could be the wheel shown in FIG. 4 or a double wheel of the type shown in FIG. 5. Wheels 613 and 615 have exemplary orifices 617, 619 and 621 and 623, respectively. The wheels 613 and 615 are responsive to either attainment of a predetermined torque level or to the forward motion of the wheels, as described above, and would thus contain either a bias means or an engagement means, also discussed above.

Obviously, numerous modifications and variations of the present invention are possible in light of the above teachings. It is therefore to be understood that within the scopeof the appended claims, the invention may be practiced otherwise than as specifically described herein.

What is claimed is:

1. A wheel, comprising:
   (a) a hollow external wheel member having at least one structural rim wall, having a central hub on said rim wall about a central axis and attachable to an axle, having an outer peripheral travel surface of a predetermined radius from said central hub, and having a plurality of orifices located about said travel surface;
   (b) a cam disc of a lesser radius than the predetermined radius of said peripheral travel surface of said external wheel member, said cam disc being movably located about the central hub of said external wheel member and within said peripheral travel surface of said external wheel member, said cam disc having a plurality of arcuated slider slots fanning out from said central hub and toward said peripheral travel surface;
   (c) a plurality of spike pins being elongated and having a first end and a second end and having a length which is less than the predetermined radius of said peripheral travel surface of said external wheel member and having a cross section of shape and size small enough to pass through said orifices on said peripheral travel surface, said spike pins having a protrusion at said first end thereon and being slidably located within said arcuated slider slots of said cam disc, and the second end of said spike pins being located at least partially within the orifices of said peripheral travel surface; and
   (d) bias means connected to said cam disc and to said external wheel member so as to hold said cam disc in a first position with said plurality of spike pins being entirely located within the radius of said peripheral travel surface by the predetermined positioning of said arcuated slider slots relative to the orifices of said peripheral travel surface and to hold said cam disc in said first position even while said wheel is being moved along a surface up to a predetermined torque, and connected so as to allow said cam disc to rotate about said central hub up to a second position with said spike pins at least partially extending and protruding through said orifices when said predetermined torque is attained, and connected so as to permit the return of said cam disc to said first position when the torque falls below said predetermined position.

2. The wheel of claim 1 wherein said hollow external wheel member has two rim walls with the central hub connecting them to one another and arranged so as to encase said movably located cam disc.

3. The wheel of claim 1 wherein said orifices are located approximately equidistantly apart from one another and said arcuated slider slots are correspondingly located approximately equidistantly apart from one another.

4. The wheel of claim 1 wherein said orifices are randomly located.

5. The wheel of claim 1 wherein said bias means is a torsion spring.

6. The wheel of claim 1 which includes at least two external wheel members having the same central axis and the same predetermined radius for its outer peripheral travel surface and are connected to one another so as to encase at least one of said movably located cam discs.

7. The wheel of claim 6 wherein said orifices are located approximately equidistantly apart from one another and said arcuated slider slots are correspondingly located approximately equidistantly apart from one another.

8. The wheel of claim 6 wherein said orifices are randomly located.

9. A wheel, comprising:
   (a) a hollow external wheel member having at least one structural rim wall, having a central hub on said rim wall about a central axis and attachable to an axle, having an outer peripheral travel surface of a predetermined radius from said central hub, and having a plurality of orifices located about said travel surface;
   (b) a cam disc of a lesser radius than the predetermined radius of said peripheral travel surface of said external wheel member, said cam disc being movably located about the central hub of said external wheel member and within said peripheral travel surface of said external wheel member, said cam disc having a plurality of arcuated slider slots fanning out from said central hub and toward said peripheral travel surface;
   (c) a plurality of spike pins being elongated and having a first end and a second end and having a length which is less than the predetermined radius of said peripheral travel surface of said external wheel member and having a cross section of shape and size small enough to pass through said orifices on said peripheral travel surface, said spike pins having a protrusion at said first end thereon and being slidably located within said arcuated slider slots of said cam disc, and the second end of said spike pins being located at least partially within the orifices of said peripheral travel surface; and (d) engagement means connected to said cam disc and to said external wheel member so as to rest said cam disc in a first position with said plurality of spike pins being entirely located within the radius of said peripheral travel surface by the predetermined positioning of said arcuated slider slots relative to the orifices of said peripheral travel surface while said wheel is not in forward motion, and connected so as to engage said cam disc to rotate about said central hub up to a second position with said spike pins at least partially extending and protruding through said orifices while said wheel is in forward motion, and connected so as to permit the return of said cam disc to said first position when the forward motion of said wheel is stopped.

10. The wheel of claim 9 wherein said hollow external wheel member has two rim walls with the central hub connecting them to one another and arranged so as to encase said movably located cam disc.

11. The wheel of claim 9 wherein said orifices are located approximately equidistantly apart from one another and said arcuated slider slots are correspondingly located approximately equidistantly apart from one another.

12. The wheel of claim 9 wherein said orifices are randomly located.

13. The wheel of claim 9 includes at least two external wheel members having the same central axis and the same predetermined radius for its outer peripheral travel surface and are connected to one another so as to encase at least one of said movably located cam discs.

14. The wheel of claim 13 wherein said orifices are located approximately equidistantly apart from one another and said arcuated slider slots are correspondingly located approximately equidistantly apart from one another.

15. A vehicular toy, comprising:
(a) a vehicular toy frame;
(b) a vehicular body attached to said frame;
(c) a plurality of wheels connected to said frame and capable of at least forward motion by controlled propulsion, wherein at least one wheel comprises:
 (a) a hollow external wheel member having at least one structural rim wall, having a central hub on said rim wall about a central axis and attachable to an axle, having an outer peripheral travel surface of a predetermined radius from said central hub, and having a plurality of orifices located about said travel surface;
 (b) a cam disc of a lesser radius than the predetermined radius of said peripheral travel surface of said external wheel member, said cam disc being movably located about the central hub of said external wheel member and within said peripheral travel surface of said external wheel member, said cam disc having a plurality of arcuated slider slots fanning out from said central hub and toward said peripheral travel surface;

(c) a plurality of spike pins being elongated and having a first end and a second end and having a length which is less than the predetermined radius of said peripheral travel surface of said external wheel member and having a cross section of shape and size small enough to pass through said orifices on said peripheral travel surface, said spike pins having a protrusion at said first end thereon and being slidably located within said arcuated slider slots of said cam disc, and the second end of said spike pins being located at least partially within the orifices of said peripheral travel surface; and (d) means connected to said cam disc and to said external wheel member so as to have said cam disc in a first position with said plurality of spike pins being entirely located within the radius of said peripheral travel surface by the predetermined positioning of said arcuated slider slots relative to the orifices on said travel surface, and, in response to some predetermined criteria, to have said cam disc to rotate about said central hub up to a second position with said spike pins at least partially extending and protruding through said orifices when said predetermined criteria is satisfied, and so as to permit the return of said cam disc to said first position when said predetemined criteria becomes unsatisfied.

16. The toy of claim 15 wherein said means is a bias means is connected to said cam disc and to said external wheel member so as to hold said cam disc in a first position with said plurality of spike pins being entirely located within the radius of said peripheral travel surface by the predetermined positioning of said arcuated slider slots relative to the orifices of said peripheral travel surface and to hold said cam disc in said first position even while said wheel is being moved along the surface up to a predetermined torque, and connected so as to allow said cam disc to rotate about said central hub up to a second position with said spike pins at least partially extending and protruding through said orifices when said predetermined torque is attained, and connected so as to permit the return of said cam disc to said first position when the torque falls below said predetermined position.

17. The toy of claim 16 wherein said bias means is a torsion spring.

18. The toy of claim 15 wherein said means is an engagement means is connected to said cam disc and to said external wheel member so as to rest said cam disc in a first position with said plurality of spike pins being entirely located within the radius of said peripheral travel surface by the predetermined positioning of said arcuated slider slots relative to the orifices of said peripheral travel surface while said wheel is not in forward motion, and connected so as to engage said cam disc to rotate about said central hub up to a second position with said spike pins at least partially extending and protruding through said orifices while said wheel is in forward motion, and connected so as to permit the return of said cam disc to said first position when the forward motion of said wheel is stopped.

* * * * *